Figure 1:
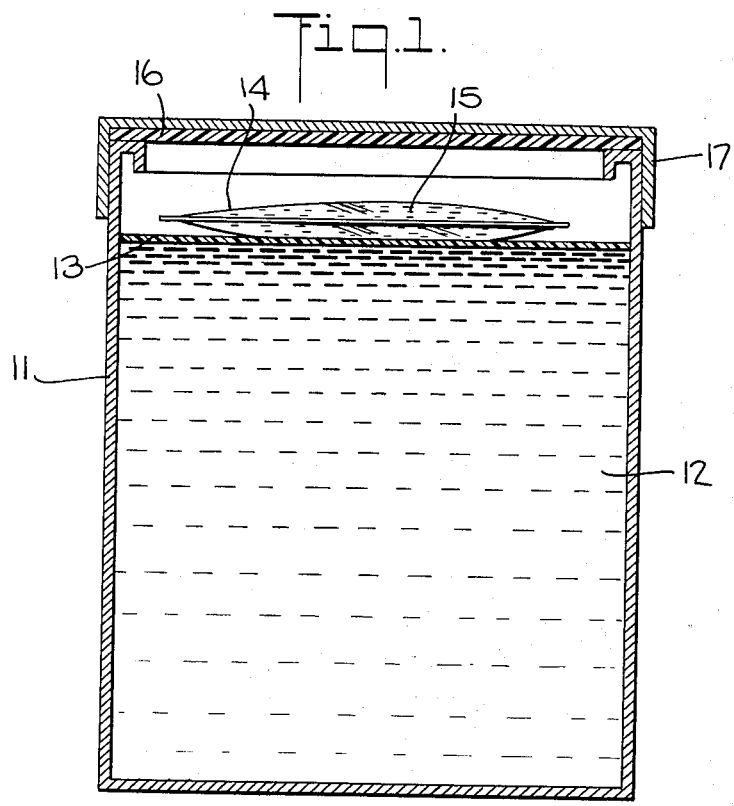

July 19, 1966 P. F. HARMON 3,261,457

INK PACKAGE

Filed March 24, 1964

INVENTOR.
PHILIP F. HARMON
BY
ATTORNEY

United States Patent Office 3,261,457
Patented July 19, 1966

3,261,457
INK PACKAGE
Philip F. Harmon, Seaford, Long Island, N.Y., assignor to Martin-Marietta Corporation, New York, N.Y., a corporation of Maryland
Filed Mar. 24, 1964, Ser. No. 354,405
5 Claims. (Cl. 206—47)

The present invention is directed to a package and more particularly to a package for printing inks and the like.

It is known that printing inks and like substances which are to be used subsequent to manufacture after a period of storage, which may be prolonged, must be stored in an incomplete condition. Specifically, driers or polymerization accelerators which are a portion of the printing ink as used in the process of printing must not be present in the ink during storage, otherwise the shelf life of the ink may be shortened considerably due to the normal action of the drier in the ink.

Also, the usual manufacturing practice is to supply the printer with a printing ink formulation containing the required drier as predetermined by the manufacturer. Frequently, however, due to conditions such as high or low humidity, differences in printing stock, type of printing process used, as well as other uncontrollable conditions encountered by the printer in the printing process, the drier content of the ink has a direct bearing on the success of the printing operation. In many instances the voluntary addition of more drier or less drier by the printer is often desirable.

Prior to the present invention it has been customary practice to supply quantity purchasers of ink with a drier mixture packed separately in bulk, for example, the drier is packed in pint or quart containers. The purchaser is then instructed to mix specified quantities of the drier with the ink shortly before the ink is to be used. One difficulty with this widespread practice is the fact that printing ink is often used in relatively small quantities, for example, pints and quarts. The quantity of drier to be incorporated into the printing ink itself is a small critical amount. This necessitates that the ink user measure out a very small critical amount of the drier, normally an amount of about ½ ounce (oz.) to about 1½ ounces. Under the conditions normally prevailing in a printing plant, accurate measurements of quantities of liquid of the order of magnitude of 1 oz. is difficult.

Another difficulty inherent in the present practice is the fact that because of possible subtle inter-action between varnishes, pigments, toners and the like present in printing inks, it is possible that inks of one formulation will require one amount of drier for optimum results and inks of a slightly different formulation will require a slightly different amount of drier for optimum results. Because of the wide variety of formulations normally employed in printing inks, it is possible but impractical for a manufacturer to provide his customer with the exact requirements of each individual ink formulation. Further, it is practically impossible under the conditions normally prevailing in a printing plant for the average workman to measure the small quantities of drier involved with sufficient accuracy to provide optimum results with relatively small quantities of a given ink.

Attempts have been made to provide a solution for the foregoing difficulties. One method was to supply the ink container with an accompanying measured amount of drier in a very small collapsible tube of the type normally used to package toothpaste, artists' pigments and the like. This was expensive in material and handling cost as well as difficult to package in the overall shipping container. Other similar methods have been employed, but none, as far as I am aware, were entirely successful when carried into practice on an industrial scale.

It has now been discovered that by means of a special packaging system, printing inks can now be delivered to the customer in a condition whereby optimum shelf life and optimum printing results can be attained without the need for special delicate measurements being made by the printer.

It is an object of the present invention to provide a novel printing ink package.

Another object of the invention is to provide a novel packaging system for printing inks.

Figure 2:
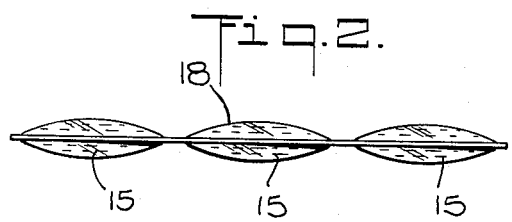

Other and further objects and advantages will become apparent from the following description taken in conjunction with the drawing in which:

FIG. 1 is a cross-sectional view of the printing ink package of the present invention, and FIG. 2 is a view of an alternative drier packet employable in the package shown in FIG. 1.

Generally speaking, the present invention contemplates a printing ink package comprising a wide mouth sealable container having a relatively viscous varnish-pigment printing ink mixture in the lower portion thereof, a disposable diaphragm atop said varnish-pigment mixture, a pre-measured quantity of drier in a flexible disposable packet atop said diaphragm, said drier being specifically adapted in quality and quantity to cooperate with said varnish-pigment mixture to provide on mixing thereof a driable printing ink, and a means for sealing the mouth of said container.

In normal practice, the container is a wide-mouth cylindrical metal can such as is customarily used for containing inks. The metal container is sealable generally by a cover which fits snugly over the lip of the container, or on occasions, it is sealable by a frictionally-engageable cover.

In its most practical form, the diaphragm comprises a waxed paper disc which floats or lies upon the surface of the viscous varnish-pigment mixture. Alternatively, the diaphragm can be made of aluminum foil or a plastic sheet material which is not attacked or dissolved by the varnish. Again, if desired, the diaphragm may be bonded to the walls of the container. The precisely measured quantity of drier superimposed upon the diaphragm is contained in a flexible sealed packet. Advantageously, this sealed packet is made of heat-sealable polyethylene film. However, materials such as specially treated cellophane, aluminum foil or the like can also be used for the packet. Another waxed paper disc, larger than the diameter of the container, is situated on top of the container and held in place by a cover forced down to complete the seal of the package.

When the package of the present invention is opened by the printer it is only necessary that the printer remove the drier packet from the container, discard the disposable diaphragm, empty the contents of the packet into the container and mix the drier thoroughly into the varnish-pigment mixture. If desired, the packet containing the driers can be in the form of separable sealed links, each link or isolated compartment containing a quantity of drier adapted to be employed with a simple aliquot portion of the varnish-pigment mixture. For example, the drier packet may be divided into two links, each of the links containing the amount of drier to be used with one-half the varnish-pigment contents of the container. In such instance the printer pours out one-half of the varnish-pigment mixture, mixes the contents of one link of the drier packet with the material removed from the container, replaces the diaphragm in the container together with the remaining drier packet link and reseals the container. In this way the exact needs of the printer can be satisfied without wasting printing ink and without requiring that the printer make accurate measurements of quantities of liquid which measurements are normally beyond the capacity of measuring devices under his control.

Referring now to the drawing, FIG. 1 shows a container 11 enclosing a volume of relatively viscous ink varnish-pigment mixture 12. On top of viscous ink mixture 12 is a waxed paper disc 13 forming a diaphragm. Drier packet 14 rests atop disc 13, is made of polyethylene film and contains drier 15. Container 11 is sealed with waxed paper disc 16 and cover 17 pressurized down overall. Drier 15 can also be packed in a link form packet 18 shown in FIG. 2. Packets 18 and 14 are advantageously made of polyethylene but can also be made of other materials which will withstand the solvent action of solvents used to dissolve metallic naphthenates and/or other types of driers.

An example of the package of the present invention comprises a pint can with a seal forming cover containing substantially a pint of linseed oil phenolic resin varnish mixed with a chrome yellow pigment to form a yellow varnish-pigment mixture. Other oils particularly drying oils such as tung oil and oiticia oil can be employed in place of linseed oil. Likewise, many resins such as alkyd and meleic can be employed in place of phenolic to form with the oil, a varnish. Of course other pigments, dyes, toners, etc. such as Toluidine, Monastral Blue, Titanium White, Red Lake C and Rubine Red can be employed in place of the chrome-yellow pigment to provide other colors, finishes, etc. As is, the varnish-pigment mixture will not dry in the normal sense of becoming hard and tack-free within a reasonable time after application. Thus, in accordance with the invention, a cooperating quantity of a drier such as a solution of naphthenates of cobalt, lead, manganese, calcium and the like is packed in the can, along with the varnish pigment mixture sealed in a polyethylene packet and separated from said varnish pigment mixture by a waxed paper diaphragm. As normally manufactured, the varnish-pigment mixture has a relatively high viscosity and the high viscosity along with a measurable surface tension normally allows a waxed paper disc to be used as a diaphragm without the necessity of effixing the disc to the can. In cases where the diaphragm will not be supported by the varnish pigment mixture itself, the diaphragm can of course be affixed to the can walls by means well known to the packaging art.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and appended claims.

Having thus described my invention, I claim:

1. A printing ink package comprising a wide-mouth sealable container having a determined quantity of a relatively viscous varnish pigment printing ink mixture in one portion thereof, a disposable diaphragm isolating said mixture, a pre-measured quantity of drier in a flexible disposable packet in the other portion thereof and a means for sealing said wide-mouth sealable container said drier being adapted in quantity and quality to cooperate with said determined quantity of varnish pigment mixture to form upon mixing therewith an operable printing ink.

2. A package as in claim 1 wherein the disposable diaphragm is made of waxed paper.

3. A package as in claim 1 wherein the flexible disposable packet is made of polyethylene film.

4. A printing ink package comprising a wide-mouth resealable container having a determined quantity of a relatively viscous varnish pigment printing ink mixture in one portion thereof, a reusable disposable diaphragm isolating said mixture, a pre-measured quantity of drier in a compartmented flexible disposable packet in the other portion thereof, and means for sealing and re-sealing said wide-mouth re-sealable container, the total quantity of said drier being adapted in quantity and quality to cooperate with said determined quantity of varnish pigment mixture to form upon mixing therewith an operable printing ink and the quantity of drier in any compartment of said compartmented flexible packet being adapted in quantity and quality to cooperate with a simple aliquot portion of said varnish pigment mixture to form upon mixing therewith an operable printing ink.

5. A package as in claim 4 wherein the flexible compartmented packet is made of polyethylene film and the flexible diaphragm is made of waxed paper.

References Cited by the Examiner

UNITED STATES PATENTS

| | | | |
|---|---|---|---|
| 2,700,461 | 1/1955 | Smith | 206—47 |
| 2,819,738 | 1/1958 | Marberg | 206—47 |
| 3,088,586 | 5/1963 | Hardman | 206—47 |

THERON E. CONDON, *Primary Examiner.*

M. L. RICE, *Assistant Examiner.*